United States Patent [19]

Kedem et al.

[11] Patent Number: 4,569,747

[45] Date of Patent: Feb. 11, 1986

[54] MODULAR ELECTRODIALYSIS DEVICE

[75] Inventors: Ora Kedem; Abraham Kedem, both of Rehovot, Israel

[73] Assignee: Yeda Research and Development Co., Ltd., Rehovot, Israel

[21] Appl. No.: 612,546

[22] Filed: May 21, 1984

[30] Foreign Application Priority Data

May 24, 1983 [IL] Israel ........................................ 68773

[51] Int. Cl.[4] .............................................. B01D 13/02
[52] U.S. Cl. ................................. 204/301; 204/182.4; 204/257
[58] Field of Search ................... 204/301, 180 P, 253, 204/257, 263, 295, 296

[56] References Cited

U.S. PATENT DOCUMENTS

| 2,799,644 | 7/1957 | Kollsman | 204/301 |
|---|---|---|---|
| 2,987,464 | 6/1961 | Wilson et al. | 204/301 |
| 3,284,335 | 11/1966 | Tsunoda et al. | 204/301 |
| 3,412,006 | 11/1968 | Alexander et al. | 204/301 |
| 3,488,276 | 1/1970 | Tarsey | 204/301 |
| 3,933,617 | 1/1976 | Yamamoto et al. | 204/301 |
| 4,172,779 | 10/1979 | Yamaguchi et al. | 204/301 |
| 4,217,200 | 8/1980 | Kedem et al. | 204/301 |
| 4,303,493 | 12/1981 | Kneifel et al. | 204/301 |

Primary Examiner—Andrew H. Metz
Assistant Examiner—B. J. Boggs, Jr.
Attorney, Agent, or Firm—Browdy and Neimark

[57] ABSTRACT

There are provided integrated modules for use in electrodialysis devices, which modules comprise a plurality of unit cells each of which consists of a cation specific membrane, a spacer and an anion specific membrane, said membranes being sealed along the edges of the cell, a spacer being provided between consecutive cells serving for sealing along the edges, an outlet being provided for the brine, outlets of individual cells being arranged as common outlet, a plurality of unit cells being confined in a frame which is provided with an outlet for said cells, each frame being provided with sealing means towards the next such frame. There are also provided electrodialysis stacks comprising a plurality of such modules.

7 Claims, 6 Drawing Figures

MODULAR ELECTRODIALYSIS DEVICE

FIELD OF THE INVENTION

There are provided modular units for assembling electrodialysis stacks. Each unit is adapted to be connected with other similar units until the required number of pairs of ion-specific membranes is assembled; the terminal compartments house electrodes.

BACKGROUND OF THE INVENTION

One of the more serious problems of electrodialysis stacks is the leakage of liquid from the various compartments. Attempts made include the provision of units of anion-specific membrane, spacer and cation specific membrane in the form of a sealed bag, provided with outlet means. A plurality of such consecutive bags, separated from each other by spacers, and arranged in a suitable housing, with terminal electrode compartments, have been in use for some time. The present invention provides modular units which can be easily assembled, which can be exchanged for new ones if some fault develops, and which overcome the shortcomings of leakage and the like.

SUMMARY OF THE INVENTION

According to the present invention there is provided a modular unit for assembly in electrodialysis stacks, each such modular unit comprising a suitable rectangular frame of adequate depth, wherein there are arranged a plurality of unit cells, separated from each other by spacers, each such unit cell consisting of a cation-specific membrane, a spacer and an anion-specific membrane, sealed at their four sides, a common exit through the frame being provided from each of the unit cells, through which the brine flows from the interior of the said units, sealing means being provided in the frame so as to obtain a tight fit with the next consecutive frame. Such sealing means can be in the form of a suitable O-ring slightly protruding from the surface of the frame facing the next frame.

For example, rectangular frames were produced of PVC, provided with an O-ring on one of the surfaces of the frame facing the next such frame; each such frame containing 16 unit cells separated from each other by spacers; with a common outlet from all units via an opening in said frame which is securely closed towards the frame so as to prevent leakage. Each such frame with its plurality of electrodialysis units separated from each other by spacers forms a modular unit. Such units can be arranged in any desired number between terminal electrode compartments.

Each of the unit cells can also be provided with two outlets. The outlets can be as set out above, or they can be in form of small tubes which are potted together and each group of tubes protrudes through the frame via a common outlet.

According to another embodiment, open-ended continuations of the unit cells enter into the openings provided in the cell. Sealing between the cells and to the frame is effected by potting the protruding parts into the frame, where the potting agent also enters into these protruding parts of the unit cell. Before the potting medium is cast, small tubes as refined to above or thick fibers are inserted into each unit cell. Said fibers are retracted after the setting, providing brine outlets, and leaving the membrane edges embedded. Said tubes may end outside the potted region, thus providing outlets.

DESCRIPTION OF THE PREFERRED EMBODIMENT

There are provided modular units for use in electrodialysis, each of which comprises a plurality of unit cells consisting of a cation selective membrane, an internal spacer and an anion specific membrane, each such unit cell being provided with at least one outlet, said unit cells being separated from each other by a spacer, said unit cells being confined within a frame, said outlets being unified in a common outlet through said frame: when each unit cell has one outlet, these are unified in one common outlet, and if each unit cell has two outlets, there are provided in said frame two common outlets, one for each group.

The invention is illustrated with reference to the enclosed schematical drawings, which are not according to scale and in which.

Figure 1:
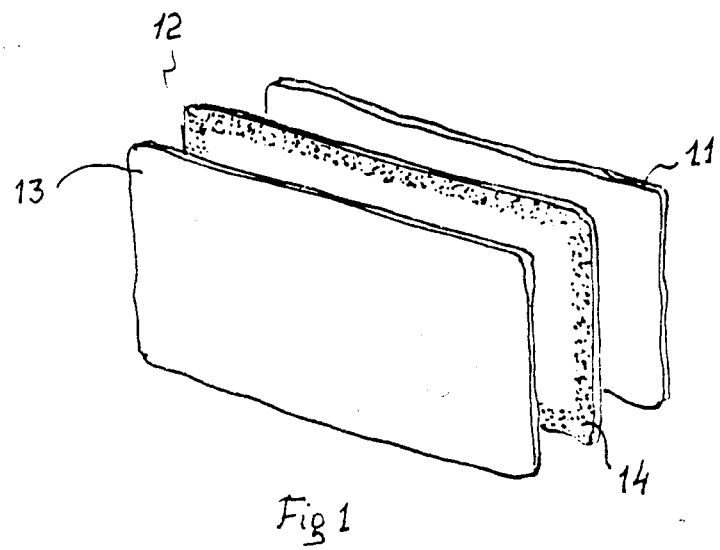
FIG. 1 illustrates the components of a unit cell.

As shown in FIG. 1 the unit cell comprises an anion selective membrane 11, a spacer 12, and a cation selective membrane 13, which spacer has a heat-sealable rim 14, whereby the components are sealed together.

Figure 2:
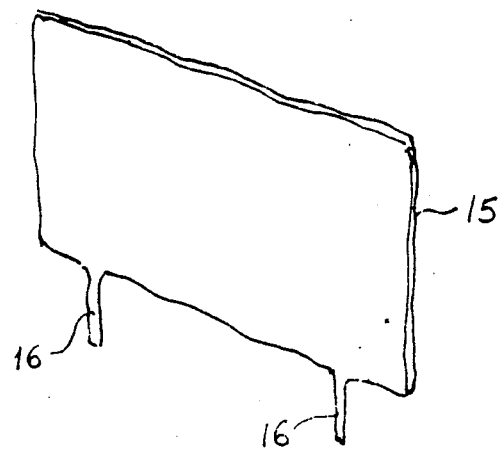
FIG. 2 illustrates a unit cell provided with two tube outlets.

The result is a unit cell shown in FIG. 2, which has a sealed edge 15, and which is provided with two outlet tubes 16 and 17.

Figure 3:
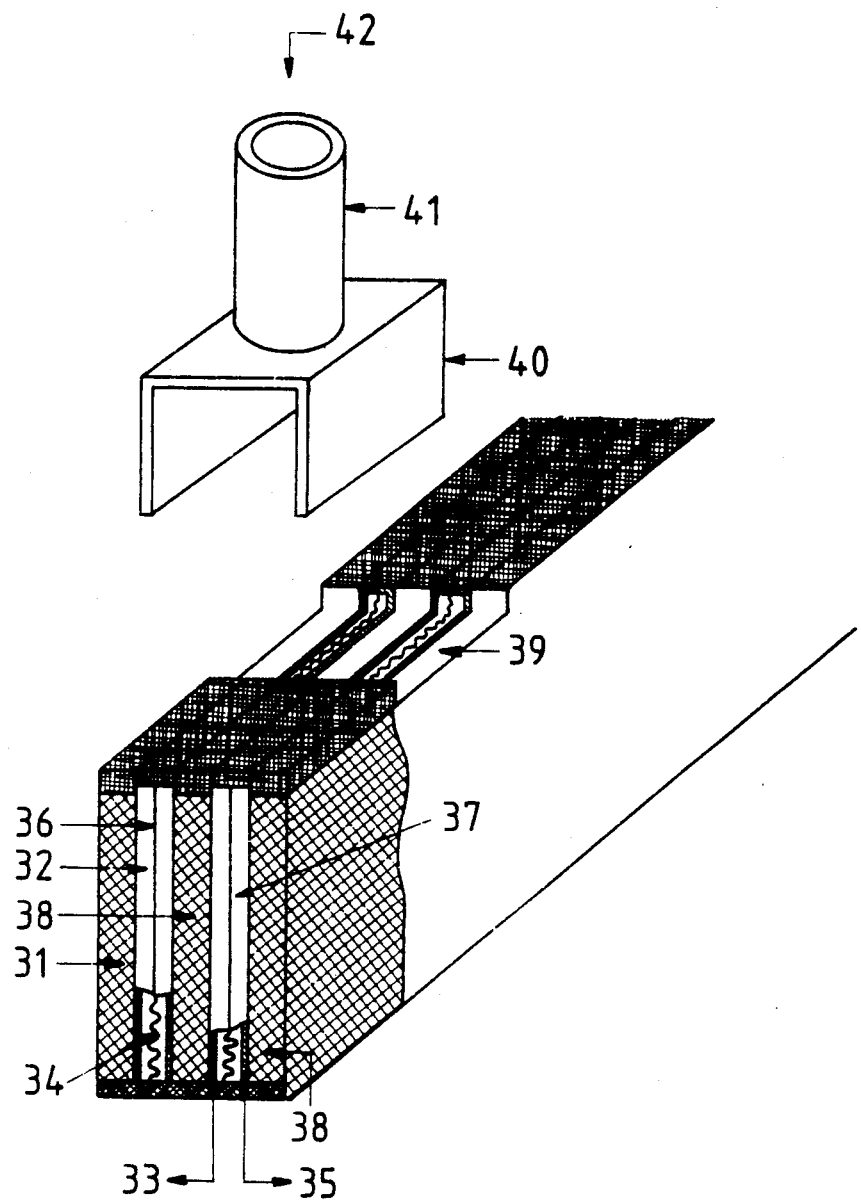
FIG. 3 illustrates the construction of a plurality of unit cells with common outlets.

In FIG. 3 there is shown the assembly of a plurality of unit cells (two only are shown, but it ought to be understood that there are normally many more, such as 10 to 20 more per "module" or per frame). As shown the assembly comprises a spacer 31, a unit cell 32 which comprises as shown in the partial cut, an anion selective membrane 33, a spacer 34 and a cation selective membrane 35, the membranes being heat sealed around the periphery by seal 36.

Between this unit cell 32 and the next unit cell 37, which has the same components as shown in the cutaway, marked by the same numbers, there is provided a further spacer 38, and so on. The space defined by said spacers 31 and 38, etc. defines the space through which the feed flows. The polymeric seal has a certain depth, and this is greater along the spacers between the unit cells than in the unit cells proper. Accordingly, when a rectangular cut is made as shown at 39, there are thus obtained openings from each of the unit cells 32,37, etc., as the seal in the rim of the unit cells extends to a depth smaller than the cutout, while the seal between unit cells extends to a depth greater than the depth of the cutout. This region is bracketed by the bracket 40 provided with outlet tube 41, through which the brine flows as indicated by arrows 42. In each package of unit cells there may be provided two such outlets, two from each unit cell, and each group provided with a common outlet of the type illustrated here (bracket which effectively seals the individual outlets from each unit tube towards the surroundings, yet provides an exit from such unit cells) with two such brackets and tubes. It ought to be understood that this is illustrative only and that such module, defined by frame with brackets comprises a larger number of stacked unit cells.

Figure 4:
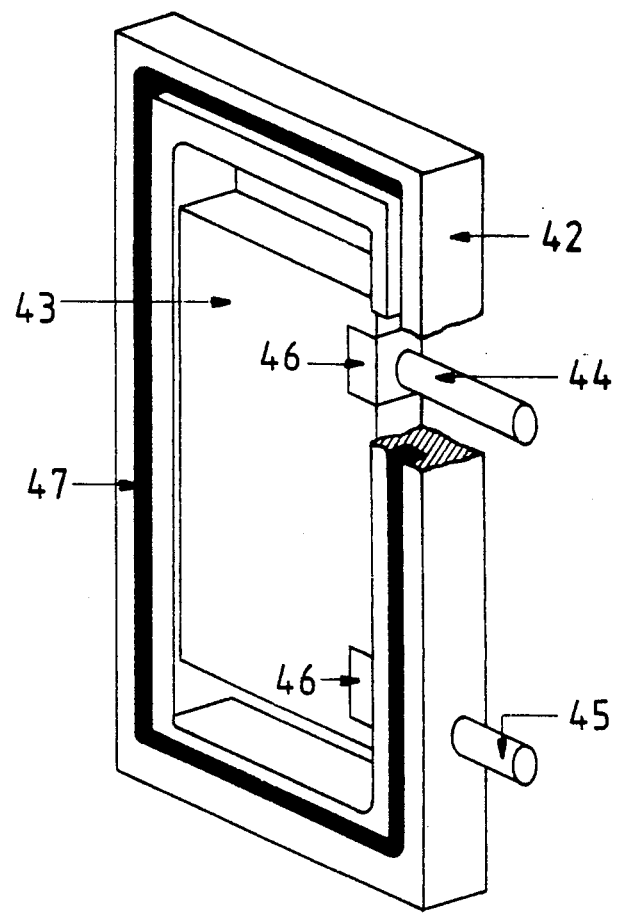
FIG. 4 illustrates a module according to the invention with two outlets.

A module according to the invention is shown in FIG. 4, where 42 is a rectangular frame, which may be produced from a suitable plastic such as PVC, which houses a stack 43 of unit cells, which frame is provided with outlets 44 and 45, each comprising a bracket 46 of the type shown in FIG. 3, through which exit means are provided common for all the unit cells. The frame 42 is provided with an O-ring seal 47, which provides a close fit with another such frame, when a number of modules are assembled in a stack.

Figure 5:
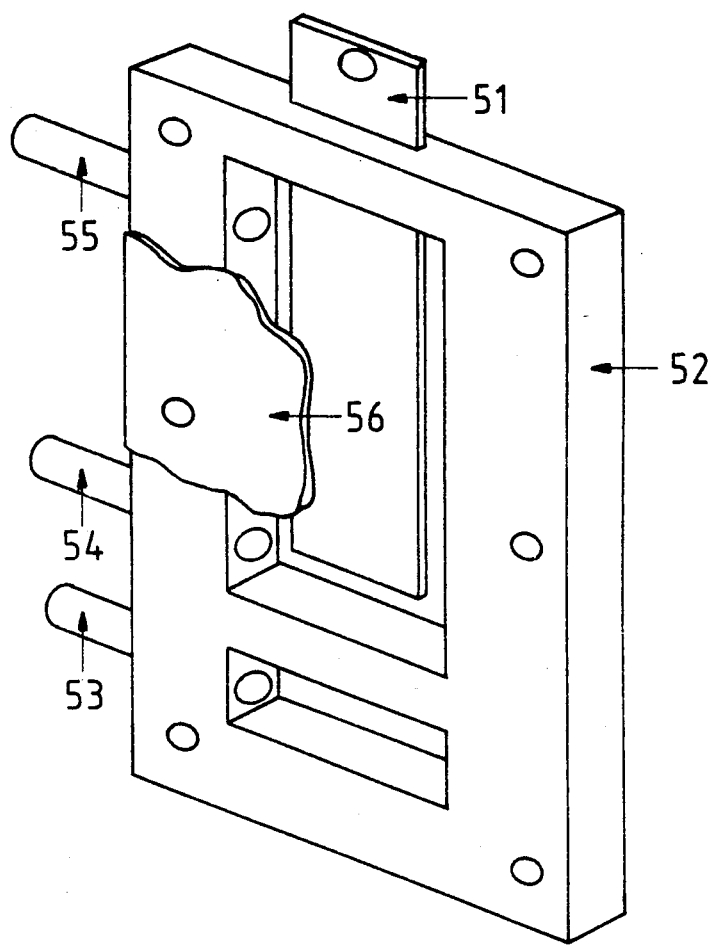
FIG. 5 illustrates a terminal electrode compartment of an electrodialysis stack.

Such stack comprises any desired number of modules of this type, and at its both ends there are arranged terminal electrode compartments of the type shown in FIG. 5 where 51 is an electrode, which protrudes into the space defined by frame 52, said frame being provided with a tube 53 for entry of dialysate, an entry tube 54 for a slurry of carbon, an exit tube 55 for said slurry, there being provided a cover membrane 56 which closes this inner compartment.

Figure 6:
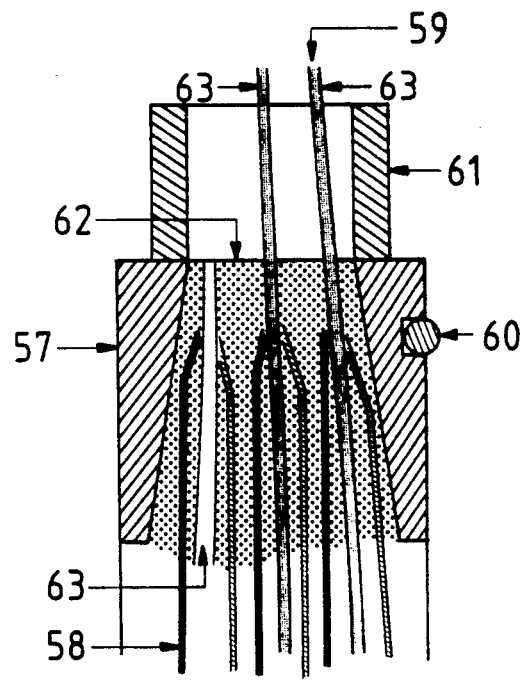
FIG. 6 illustrates another construction of a common outlet of unit cells.

An arrangement for a perfectly sealed outlet with embedded membranes is illustrated in FIG. 6, where 57 is a cut of the frame at one of the openings provided in the frame, 60 is an O-ring, 58 is one of the shown unit cells and 62 is the embedding agent poured into the opening. The rods 59 are retracted after setting and the thus created channels 63 converge into the sleeve 61, serving as outlet.

The main advantage of the arrangement of a plurality of modules in a stack is the perfect and easy seal between the modules, and the efficient sealing of the outlets from each of the unit cells via a common outlet means via the frames of the modules.

According to a preferred embodiment of the invention a long sleeve is prepared from an anion selective and a cation selective membrane, which are sealed along their two edges. This sleeve is cut to the width of the individual unit cells, a spacer is inserted into this piece of sleeve, and the two other edges are heat of polymer-sealed up to a certain width of rim. Such unit cells are stacked with spacers between the cells, which are provided with a rim along the larger edges up to a greater depth than the sealing of the cells themselves, and these are sealed together. The number of unit cells is that required for a module, and experiments with 16 such cells per module gave good results. After stacking together, the rectangular opening or openings are cut out and provided with brackets as illustrated above, to provide common outlets from all the unit cells, and this package is inserted into the frame and the exit is glued as required.

We claim:

1. A module for electrodialysis devices, said module comprising
   a plurality of consecutive unit cells, each unit cell comprising an anion selective membrane and a cation specific membrane separated by an internal spacer and thermally sealed together at the edges thereof,
   a spacer being provided between adjacent pairs of said plurality of consecutive unit cells,
   each unit cell having extending from a first edge thereof at least one outlet communicating with said internal spacer, to provide a plurality of outlets from said plurality of consecutive unit cells, and wherein said plurality of outlets all point in the same direction,
   a frame for retaining said plurality of consecutive unit cells, said frame defining the periphery of said module,
   said frame having a common outlet through which extends said plurality of outlets from the individual cells,
   the first edges of said consecutive unit cells being potted together about said outlets with said frame and defining said common outlet, thus providing an outlet which is sealed in said frame, and in which said plurality of consecutive unit cells is hermetically sealed together.

2. An electrodialysis stack comprising a plurality of modules, each said module comprising
   a plurality of consecutive unit cells, each unit cell comprising an anion selective membrane and a cation specific membrane separated by an internal spacer and thermally sealed together at the edges thereof,
   a spacer being provided between adjacent pairs of said plurality of consecutive unit cells,
   each unit cell having extending from a first edge thereof at least one outlet communicating with said internal spacer, to provide a plurality of outlets from said plurality of consecutive unit cells, and wherein said plurality of outlets all point in the same direction,
   a frame for retaining said plurality of consecutive unit cells, said frame defining the periphery of said module,
   said frame having a common outlet through which extends said plurality of outlets from the individual cells,
   the first edges of said consecutive unit cells being potted together about said outlets with said frame and defining said common outlet, thus providing an outlet which is sealed in said frame, and in which said plurality of consecutive unit cells is hermetically sealed together,
   modules at the ends of said stack having electrode compartments provided with entry and exit ports for feeding product to be treated and for end product.

3. A module for use in electrodialysis devices, which module comprises a plurality of unit cells, each of which comprises an anion selective membrane, an internal spacer, a cation specific membrane, thermally sealed together at edges of the cell, a spacer being provided between each of such consecutive cells, at least at one of which edges there is provided an outlet from each cell, outlets of the individual cells pointing in the direction of the same edge of the module being potted together providing a common outlet, said plurality of unit cells and spacers being arranged in an inner space of a frame of the module which frame is provided with at least one outlet for said outlet, via the frame of the modules where the open spaces of the modules parallel with the membranes provide a continuum with adjacent modules, at least one of such modules being terminated at both of its ends with electrode compartments which compartments are provided with entry and exit port for the feed and end product, respectively.

4. A module as claimed in claim 3, wherein the outlet from the unit cells comprises a plurality of individual tubes, one or two from each cell, which are united in one or two common outlets via the frame of the module.

5. A module as claimed in claim 3, wherein there are provided corresponding outlets from each of the unit cells by cutting out a piece of the rim of the frame of the potted cells, which is bracketed by a fitting hermetically sealing bracket, provided with a tubular common outlet for all the cells via the module frame.

6. A module according to claim 3, wherein a circumferential O-ring is provided on the frame facing the next such frame of the stack.

7. An electrodialysis stack comprising a plurality of modules, each module comprising a plurality of unit cells, each of which comprises and anion selective membrane, an internal spacer, a cation specific membrane, thermally sealed together at edges of the cell, a being provided between each of such consecutive cells, at least at one of which edges there is provided an outlet from each cell, outlets of the individual cells pointing in the direction of the same edge of the module being potted together providing a common outlet, said plurality of unit cells and spacers being arranged in an inner space of a frame of the module which frame is provided with at least one outlet for said cells, via the frame of the modules where the open spaces of the modules parallel with the membranes provide a continuum with adjacent modules, and suitable electrode compartments at the two ends of the stack.

* * * * *